Oct. 19, 1954   J. CANETTA ET AL   2,692,156
THROTTLE CONTROL APPARATUS FOR LOCOMOTIVES
Filed July 24, 1948   3 Sheets-Sheet 3

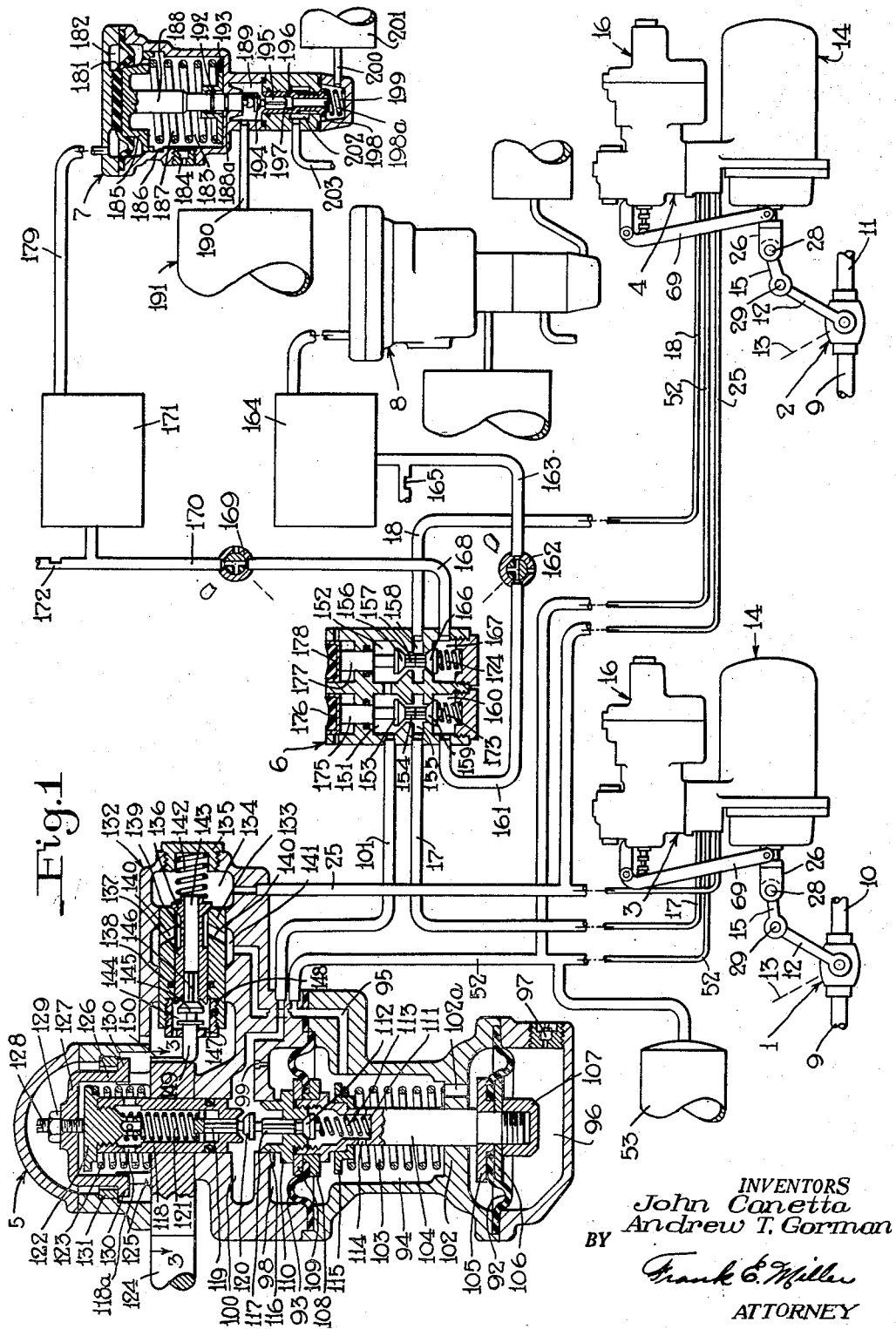

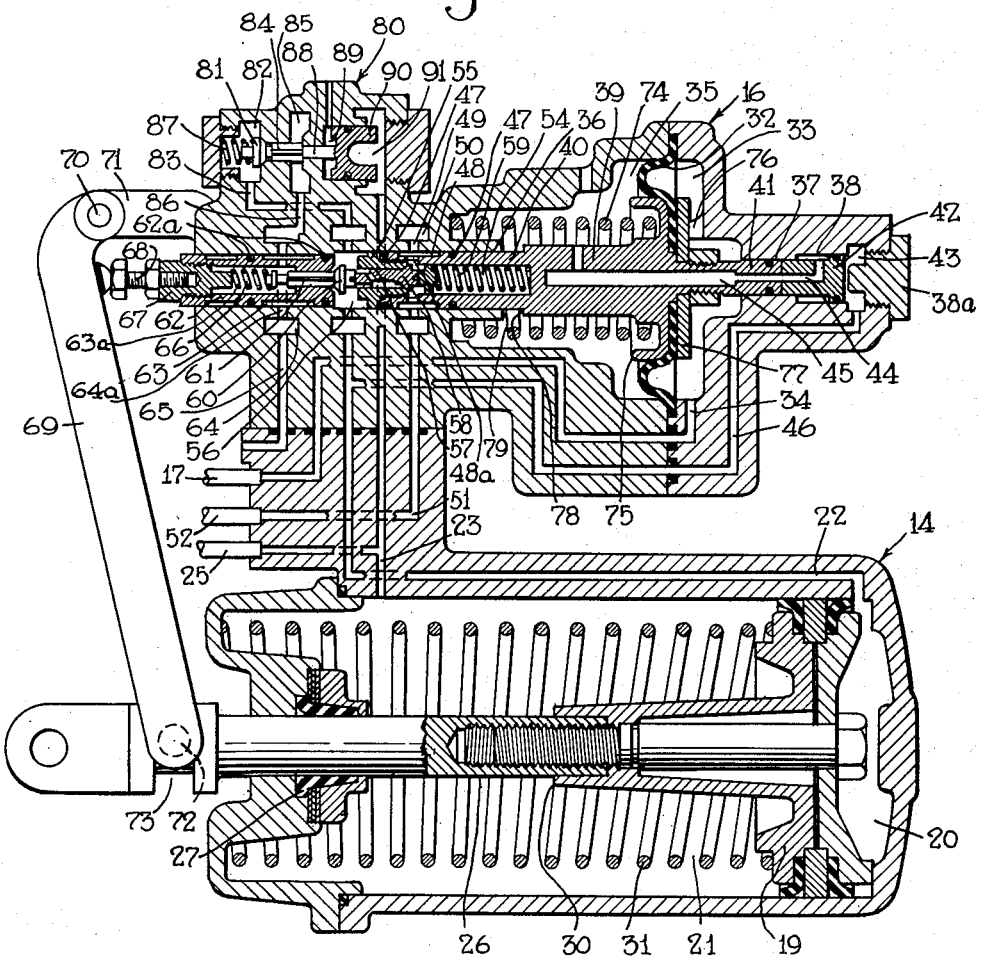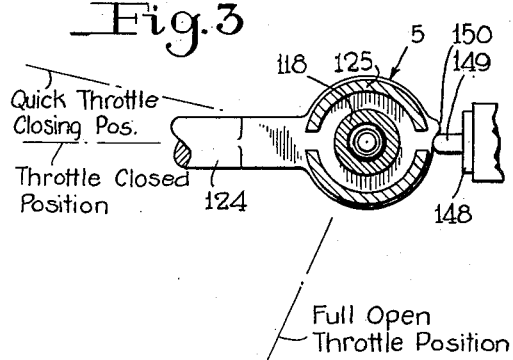

INVENTORS
John Canetta
Andrew T. Gorman
BY
Frank E. Miller
ATTORNEY

Patented Oct. 19, 1954

2,692,156

UNITED STATES PATENT OFFICE 2,692,156

THROTTLE CONTROL APPARATUS FOR LOCOMOTIVES

John Canetta, Hempstead, N. Y., and Andrew T. Gorman, Pitcairn, Pa., assignors to Westinghouse Air Brake Company, a corporation of Pennsylvania Application July 24, 1948, Serial No. 40,464

9 Claims. (Cl. 291—2)

This invention relates to locomotive control apparatus and more particularly to improvements in fluid pressure controlled apparatus for controlling steam throttles on double engine locomotives.

In such apparatus, one operator's control device usually is arranged to control the operation of two throttle adjusting motor devices, one for each engine, whereby the throttle of both engines may be opened or closed in unison and to equal degrees.

On locomotives of this type it has been experienced, when starting a train especially, that the front engine has a considerably greater tendency for slipping its wheels than the rear engine and with the usual throttle control apparatus, it is necessary when wheel slip occurs to reduce the steam supply to both engines in order to stop the wheel slip on the one engine.

It is therefore one object of our invention to provide an improved locomotive throttle control apparatus which will enable independent closing of the throttle on one engine of a two engine locomotive while the other throttle remains in any selected open position.

Another object of our invention is to provide an improved throttle control apparatus for two engine locomotives having operator's control means for automatically closing the throttle on either engine, in case of slipping of the wheels thereon, while the other throttle remains open, and for a predetermined period of time after wheel slip is detected, to apply sand to the rail surfaces in front of the slipping engine wheels.

Still another object of our invention is to provide an improved throttle control apparatus for two engine locomotives having operator's control means for simultaneously positioning a plurality of power control throttles, one on each engine, and for independently closing either throttle without changing the other, together with means for automatically closing the throttle on either engine in case the wheels thereon should slip and to apply sand to the rail surface in front of the slipping wheels.

Other objects and advantages will appear in the following more detailed description of the invention.

In the accompanying drawings;

Fig. 1 is a diagrammatic view of a throttle control apparatus, embodying one form of the invention, for a two engine locomotive which provides independent manual closing of the throttle on either engine while the other throttle remains unchanged and which further provides for automatic sanding of the rail surface in front of the wheels of the engine upon closing the throttle thereon.

Fig. 2 is a diagrammatic view of the throttle positioning motor, shown in elevation in Fig. 1, with its parts in a normal or throttle closed position.

Figure 4:
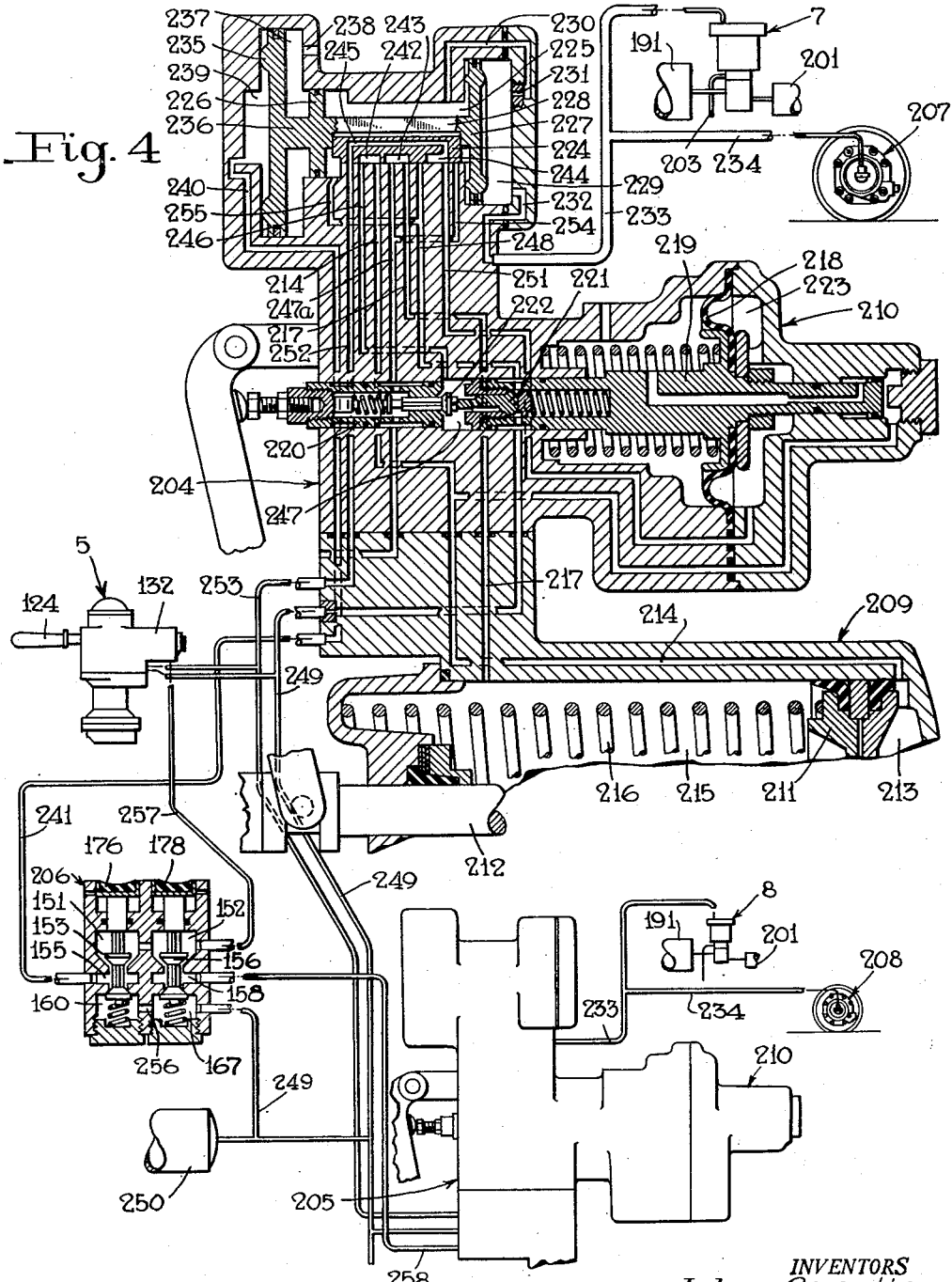

Fig. 3 is a plan view, with a portion broken away, of an operator's throttle control valve shown in section in Fig. 1; and Fig. 4 is a diagrammatic view of a throttle control apparatus embodying another form of our invention in which the closing of the throttle on either engine may be accomplished either manually without sanding of the rail surfaces, or the throttle on either engine may be automatically closed and the rail surfaces ahead of the respective engine wheels sanded when slipping starts.

*Description—Figs. 1 and 2*

As shown in Fig. 1, the throttle control apparatus therein illustrated may comprise two adjustable throttle valves 1 and 2, two throttle valve positioning motors 3 and 4, an operator's throttle control valve device 5, a throttle closing valve device 6 and two sanding control valve devices 7 and 8.

The adjustable throttle valves 1 and 2 control the flow of power fluid, such as steam under pressure or power fuel, from a supply pipe 9 to pipes 10 and 11 which are arranged to convey the power fluid to, respectively, the propulsion means of two engines of a locomotive. Each throttle valve is operable to regulate or vary the amount of power fluid to the respective engine according to the adjustment of a lever 12 between a throttle closed position in which said lever is shown in the drawing, and a full open throttle position indicated by the broken line 13.

The throttle valve positioning motors 3 and 4 are similar in structure and each comprises a power portion 14 connected by a link 15 to the throttle lever 12 of the respective throttle valve 1 or 2, and a pilot portion 16 for regulating operation of the power portion 14 to position said throttle valve in accordance with pressure of fluid provided in a control pipe 17 connected to the throttle positioning motor 3 or a pipe 18 connected to the positioning motor 4. The positioning motors 3 and 4 are substantially the same as that disclosed and described in the application of Harry C. May, Serial No. 550,691, filed August 23, 1944, and assigned to the assignee of the present application.

As shown in Fig. 2, the power portion 14 of each positioning motor comprises a casing containing a double acting piston 19 having at one side thereof a pressure chamber 20 and at the opposite side thereof a pressure chamber 21. The chamber 20 is connected by a fluid pressure control passage 22 to the pilot portion 16. The chamber 21 is connected by a passage 23 to the pilot portion 16 and by a pipe 25 to the operator's throttle control valve 5.

The piston 19 is firmly secured to one end of a piston rod 26 extending through the chamber 21 and a suitable packing gland 27 to the exterior of the casing. The exterior end of the piston rod 26 is connected by a pin 28 (Fig. 1) to the respective link 15, the opposite end of which is pivotally connected by a pin 29 to the end of the respective throttle valve control lever 12.

Movement of the power piston 19 in its casing will rock the respective throttle control lever 12 for varying the supply of power fluid from the supply pipe 9 to the delivery pipe 10 or 11 and to the respective engine. With the piston 19 in the position in which it is shown in Fig. 2, the respective throttle control lever 12 will occupy the throttle closed or power off position in which position the lever is shown in Fig. 1, while with said piston in contact with a shoulder 30 the respective throttle control lever 12 will occupy its fully open throttle or maximum power position indicated by the broken line 13. By suitable adjustment of the power piston 19 between the two extreme positions just described, the respective throttle valve 1 or 2 may be correspondingly adjusted to provide any desired rate of flow of power fluid to the respective engine, as will be obvious.

A coil spring 31 encircles the piston rod 26 in the chamber 21 and bears against the casing and the adjacent face of piston 19 for moving piston 19 to the power off position, in which it is shown in Fig. 2, when fluid under pressure is released from the chamber 20. When fluid is supplied to chamber 20 at a pressure sufficient to overcome the opposing force of spring 31, the piston 19 will move against said spring for moving the throttle control lever 12 out of its throttle closed or power off position in the direction of the fully open throttle position, indicated by the broken line 13, to a position corresponding to the pressure of such fluid. A maximum pressure of fluid in chamber 20 will move piston 19 against spring 31 until the shoulder 30 engages the casing wall and will move the throttle to the fully open position.

The pilot portion 16 of each throttle positioning motor comprises a casing containing a flexible diaphragm 32 at one side of which is a control chamber 33 connected by a passage 34 to the respective control pipe 17 or 18. At the opposite side of diaphragm 32 is a non-pressure chamber 35. Two casing bores 36 and 37 are located at opposite sides of the diaphragm 32 and are coaxially aligned therewith. The bore 36 is open at one end to the chamber 35 and at the other end to the exterior of the casing. The bore 37 is open at one end to chamber 33 and at the other end is open to one end of a larger bore 38, the opposite end of which is closed by a cap nut 38a.

A stem 39 extends centrally through the diaphragm 32 and is secured thereto for movement therewith. One end portion 40 of the stem 39 is slidably disposed in the adjacent end of the bore 36 while an opposite end portion 41 is arranged to slide with sealing engagement in the bore 37. The end portion 41 extending into bore 37 engages the smaller end of a plunger 42 slidably mounted in the bore 38. The larger end of the plunger 42 is disposed to slide with sealing engagement in the bore 38 to prevent leakage of fluid pressure from a chamber 43, formed between the outer end of plunger 42 and the cap nut 38a closing the end of bore 38 to the opposite side of said plunger which is open at all times to the atmosphere by way of a passage 44 in said plunger and a registering passage 45 in the stem 39, which latter passage opens to chamber 35. The chamber 43 is constantly connected by a passage 46 to the passage 22.

The end portion 40 of stem 39 disposed within bore 36 is provided with two spaced sealing rings 47 having sealing and sliding contact with the wall of said bore to prevent leakage of fluid under pressure past said sealing rings from an annular recess 48 provided in the peripheral surface of the end portion 40 between said sealing rings. The recess 48 is open through a plurality of ports 49 to an annular cavity 50 in the casing and thence by a passage 51 to a fluid pressure supply pipe 52 which may be constantly supplied with fluid under pressure from a supply reservoir 53.

The end portion 40 of stem 39 has a plurality of ports 48a connecting recess 48 to a central bore 54 extending into said stem from the end of said portion, a nut 55 being secured to said end of said bore and for closing the end of said bore and having sliding engagement with the wall of casing bore 36. The nut 55 has an axial bore one end of which is open to a chamber 56 at the outer end of the nut while the inner end is open to the bore 54. Slidably mounted in the axial bore of nut 55 is a fluted stem 57 projecting from a supply valve 58 contained in the bore 54 and arranged to seat against the inner end of said nut. A precompressed bias spring 59 disposed in the bore 54 acts on the supply valve 58 for urging said valve to its seated or closed position as shown. The fluted stem 57 extends beyond the outer face of nut 55 into chamber 56 and therein engages a release valve 60 having a fluted stem 61 slidably mounted in an axial bore provided in a plunger 62. The plunger 62 is slidably disposed in bore 36 and is provided with two spaced sealing rings 62a having sealing and sliding contact with the bore 36 to prevent leakage of fluid under pressure past said rings. An annular recess 63 is provided in the peripheral surface of the plunger 62 between the two sealing rings. The recess 63 is open through a plurality of radial ports 64a in the wall of bore 36 to an annular cavity 64 in the casing and thence by a port 65 to the atmosphere. The recess 63 is also connected by one or more ports in the plunger 62 to a bore 63a therein into which the release valve stem 61 extends and which contains a precompressed bias spring 66 acting on said stem for urging the release valve 60 to an unseated or open position as shown. The pressure of spring 66 on the release valve 60 however is less than that of spring 59 on the supply valve 58. A plug 67 closes the outer end of the bore 63a in plunger 62, said plug having an adjusting screw 68 and a lock nut thereon for contacting said plug and locking the adjusting screw in an adjusted position. The outer end of the adjusting screw is adapted to bear against a lever 69, one end of which is mounted to rock on a pin 70 which is mounted in a fixed arm 71 projecting from the casing. The opposite end of the lever 60 is operatively connected, exteriorly of the casing, to the power piston rod 26 by means of a lug 72 projecting from said lever into an annular groove 73 provided in said piston rod.

It will be noted that chamber 56 containing the release valve 60 is formed between the adjacent ends of the plunger 62 and the nut 55 and that said chamber is open to the passage 22 leading to the control chamber 20 at the one side of the power piston 19 and by way of passages 22 and 46 to the chamber 43 at the outer face of plunger 42. It is desired to point out that the face of plunger 42, subject to fluid pressure in chamber 43, is of the same area as that of nut 55 subject to pressure of fluid in chamber 56, whereby the pressure of fluid effective in chamber 56 tending to urge the structure, including diaphragm 32, in the direction of the right hand will be counterbalanced by an equal pressure of fluid acting in the opposite direction in chamber 43 on the face of the plunger 42.

The chamber 35 contains a precompressed control spring 74 which encircles the stem 39 with one end bearing on the casing, while the other end bears against a follower 75 which is provided on stem 39 adjacent the diaphragm 32. The spring 74 is operative to urge the stem 39 and the diaphragm 32 in the direction of the position in which they are shown in the drawing and which is defined by engagement with a casing stop 76 of a follower plate 77 secured to the stem 39. The spring 74 is designed to yield under fluid pressure in chamber 33 and to cooperate with such fluid pressure to define definite and different positions of diaphragm 32 and stem 39 corresponding to the pressure of such fluid. Preferably the spring is precompressed to a degree which will move the diaphragm to the extreme right hand position as shown in Fig. 2 against a relatively low pressure of fluid in chamber 33, such as eight pounds. The spring will yield and allow movement of the diaphragm and stem to the extreme left hand position in which further movement toward the left is prevented by reason of engagement of a shoulder 78 on the stem 39 with a stop 79 on the casing when a relatively high pressure of fluid is present in chamber 33, such as sixty pounds.

Each of the throttle positioning motors further embodies an insuring valve device 80 comprising a poppet valve 81 contained in a chamber 82 connected by a passage 83 to chamber 56, and thence by passage 22 to the control chamber 20 at the right hand side of the power piston 19. The valve 81 has a fluted stem 84 extending through a casing bore into a chamber 85 which is open to passage 86 and thence through chamber 64 and passage 65 to the atmosphere. The chamber 82 also contains a precompressed spring 87 which acts on valve 81 for urging it to a closed position.

In chamber 85 the fluted stem 84 of the valve 81 engages a stem 88 which slidably extends through a bore in a casing wall into a chamber 89 at one side of a piston 90 to which the stem is connected. The chamber 89 is continuously connected to the atmosphere by a port in the casing. At the side of piston 90 opposite chamber 89 is a pressure chamber 91 connected to the passage 23.

In operation, let it be assumed that the pressure of fluid in chamber 33 is initially eight pounds or less. The spring 74 is effective under this condition to move the stem 39 and diaphragm 32 to the position shown wherein the follower plate 77 engages the stop 76. The supply valve 58 is seated by spring 59 to prevent flow of fluid under pressure from bore 54, and hence from the supply reservoir 53, to chamber 56 and by way of port 22 to chamber 20 at the right hand side of the power piston 19. Spring 66 acting on the release valve stem 61 and the release valve 60 will unseat said release valve, for connecting chamber 56 and, hence via port 22, chamber 20, to the atmosphere by way of passage 65. With chamber 20 at atmospheric pressure, the spring 31 on the opposite side of piston 19 is effective to move the piston to the position shown, in which the throttle control lever 12 is positioned for closing the respective throttle valve 1 or 2 to cut off the supply of power fluid to the respective engine.

Let it now be assumed that it is desired to admit power fluid to the respective engines for propelling same. To obtain this, fluid under pressure exceeding eight pounds, by a degree proportioned to the rate it is desired that power fluid be supplied to the engine, is supplied via pipe 17 or 18 and passage 34 to chamber 33 at the right hand side of the diaphragm 32. This increased pressure of fluid acting on the diaphragm 32 is effective to overcome the opposing force of spring 74 and to deflect said diaphragm in the direction of and against spring 74 until the increasing force of the spring counterbalances the force of the increased pressure of fluid acting on said diaphragm. As the diaphragm 32 is thus moved in the direction of spring 74, the end portion 40 of stem 39 will move into chamber 56, first seating the release valve 60 by reason of the force of spring 59 exceeding the force of spring 66, after which the supply valve 58 is unseated to admit fluid under pressure from the supply reservoir 53, via pipe 52, passage 51, chamber 50, ports 49, bore 54, past supply valve 58, to chamber 56 and from thence by passage 22 to chamber 20 at the right hand face of the power piston 19 and by passages 22 and 46 to chamber 43 on the face of plunger 42 where the force of the fluid pressure in chamber 56 against the stem 40 is counterbalanced. Fluid pressure admitted to chamber 20 is effective over the piston 19 to overcome the force of spring 31 and move the piston against said spring. Movement of the power piston 19 acts through the lever 69 to allow movement of the plunger 62 by pressure of fluid in chamber 56 and by force of spring 66 in a direction away from the nut 55. Fluid under pressure is admitted to chamber 20 until the movement of piston 19 moves the lever 69 to a position in which the accompanying movement of plunger 62 allows the supply valve 58 to seat and cut off further supply of fluid pressure to chamber 20.

The movement of piston 19 in the direction of spring 31 is thus proportional to the movement of the diaphragm 32 against the control spring 74, this being proportional to the pressure of fluid in chamber 33.

It will thus be seen that upon a certain deflection of diaphragm 32, as determined by the pressure of fluid provided in chamber 33, the power piston 19 will adjust the respective throttle control lever 12 out of its throttle closed position toward the full open throttle position in an amount proportional to the pressure of fluid provided in chamber 33 in excess of the initial eight pounds.

If the throttle valve positioning motors are adjusted to any position in which the respective throttle valve 1 or 2 is less than fully open, the throttle opening may be increased by increasing the pressure of fluid in chamber 33 whereupon the positioning motor will operate to correspondingly further extend the power piston rod 26 and to increase the throttle opening by movement of the throttle control lever 12 in the direction of the broken line 13 for supplying a corresponding increased amount of power fluid to the respective engine.

If on the other hand, the operator desires a reduction in the amount of power fluid supplied to the engines, he will reduce the pressure of fluid acting in chamber 33, according to a desired reduction in power fluid. The spring 74 will then move the diaphragm 32 in the direction of chamber 33 to a new and corresponding position in which the decreased force of the fluid pressure in said chamber is counterbalanced by the decreasing spring force. As the diaphragm 32 and the attached stem 39 are moved toward chamber 33, the supply valve 58 is carried with the stem and allows the spring 66 to unseat the release valve 60 to release fluid pressure in chamber 56, and hence in chamber 20, to the atmosphere. As fluid pressure is thus released from chamber 20, spring 31, acting against piston 19 in opposition to the fluid pressure in chamber 20, will move said piston in the right hand direction until the plunger 62 is moved against the seat of the release valve 60 by the motion of the lever 69.

The new position assumed by piston 20 will be one in which piston 19 does not engage the casing and the position of the lever 12 will be such as to control the power fuel supply proportional to the pressure of fluid retained in chamber 33.

If the pressure of fluid in chamber 33 is reduced to or below the eight pounds, however, the movement of the power piston 19 by spring 31 toward chamber 20 will be complete, in which case the respective throttle control lever 12 will assume its full throttle closed position.

It will now be seen that any desired rate of supply of power fluid to the engines may be obtained by providing the proper pressure of fluid in chamber 33 of the respective positioning motor 3 or 4.

In the above description of operation it will be noted that in each of the positioning motors 3 or 4, the movement of the power piston 19 and the adjustable throttle valve control lever 12 toward the throttle closed position upon release of fluid pressure from chamber 20 is dependent upon and effected solely by spring 31. It is further noted that the spring 66 must unseat the release valve to release fluid pressure from chamber 20 in order that the piston 19 can be moved to the throttle closed position.

To positively ensure the closing of the throttle in case of spring 31 being broken and to quickly close the throttle in emergency, fluid pressure may be supplied from the operator's control valve device 5 in a manner to be explained later, by way of pipe 25 and passage 23 to chamber 21 to move the piston 19 to the throttle closed position. To insure this movement of piston 19, the fluid supplied to passage 23 is also effective in chamber 91 on piston 90 in the insuring valve 80 to move said piston in the direction of chamber 89, during which movement the plunger 88 engages the valve stem 84 to unseat valve 81 and thereby open to atmosphere the power piston chamber 20 by way of passage 22, chamber 56, passage 83, passage 86, chamber 64 and passage 65.

The operator's throttle control device 5, Fig. 1, comprises a casing containing two coaxially aligned and spaced apart flexible diaphragms 92 and 93 of equal areas. A chamber 94 formed between the two diaphragms is connected by a passage 95 to pipe 52 and to the supply reservoir 53. At the opposite or lower side of diaphragm 92 is a chamber 96 which is open at all times to the atmosphere through a breather opening 97. At the upper side of diaphragm 93 is a chamber 98 which is connected at all times by a choke 99 to a chamber 100. The chamber 100 is connected by a pipe 101 to the throttle closing valve device 6.

The chamber 94 is divided by a partition wall 102 which serves as a support for a control spring 103. Wall 102 is provided with a constantly open communication 102a to allow equalization of fluid pressures on both sides of the wall and also with a bore concentric with the diaphragms 92 and 93, and slidably mounted in this bore is a stem 104. Stem 104 is firmly secured to the central portion of diaphragm 92 by a follower 105, follower plate 106 and a nut 107 and is secured to the central portion of diaphragm 93 by a follower 108, follower plate 109 and a nut 110. The end of stem 104 adjacent diaphragm 93 is provided with a chamber 111 containing a valve 112 and spring 113. Chamber 111 is open to chamber 94 by a plurality of ports 114. A collar 115 fits about stem 104 and against a shoulder on the stem and serves to transmit the force of the control spring 103 to said stem.

The nut 110 is provided with a cylindrical extension 116 which is arranged to slide in a bore in the casing wall separating chambers 98 and 100, said bore being concentric with stem 104. The nut 110 is further provided with a central bore connecting chamber 111 in stem 104 with chamber 100. A fluted stem 117 attached to valve 112 extends through the bore in nut 110 into chamber 100 and a seat for the supply valve 112 is provided on the nut about said bore.

A plunger 118 is slidably mounted in an axial bore in the casing and extends into chamber 100 opposite the nut 110. The plunger 118 is provided with a sealing ring having sealing and sliding contact with the surface of the casing bore to prevent leakage of fluid pressure from chamber 100. In the end of plunger 118 adjacent chamber 100 is an axial bore in which is slidably disposed a fluted stem 119 of a release valve 120 contained in said chamber, said plunger being provided with a seat for said release valve around the end of the bore adjacent said chamber.

The release valve 120 and its stem 119 are arranged in coaxial relationship with the supply valve 112 and its stem 117 and said release valve is urged into contact with the end of said supply valve stem by a spring 121 contained in a central bore of the plunger 118. The end of spring 121 opposite the release valve stem 119 is supported by a cap nut 122 which is firmly secured to the plunger 118 to close the end thereof. The cap nut 122 extends beyond the outer portion of the plunger to provide a seat for a bias spring 123. The bore in plunger 118 is open to the atmosphere at all times by a number of ports 118a in the plunger adjacent the cap nut 122.

The pressure of spring 121 against the release valve stem 119 is less than the pressure of spring 113 against the supply valve 112 with the result that when plunger 118 is moved in the direction of chamber 100, spring 113 is effective to hold the supply valve 112 seated and to support the release valve 120 against movement until said release valve is engaged by the valve seat on said plunger following which further movement of the plunger will act through said release valve to unseat said supply valve. Upon movement of plunger 118 away from chamber 100 or upon movement of stem 104 and nut 110 away from plunger 118 the spring 113 is effective to maintain the release valve 120 seated until the supply valve 112 engages its seat on the nut 109. Spring 121 is effective to hold the release valve 120 in contact with the supply valve stem 117 whereby the valve seat on plunger 118 may move out of contact with the said release valve.

A handle 124 journaled on plunger 118 and extending through an opening in the casing is adapted to be moved in a horizontal plane between a quick throttle closing position and a full open throttle position. Between these positions but closer to the quick closing position is a position which may be called a throttle closed position. See Fig. 3. The portion of handle 124 which encircles plunger 118 serves as a support to the bias spring 123 and is provided with an upwardly extending cylindrical portion 125 encircling the spring 123 and provided with two oppositely arranged slots to receive two oppositely arranged legs 126 of an inverted U-shaped member 127. The upper central portion of member 127 is arranged to receive a screw-threaded adjusting screw 128 which may be locked in an adjusted position by a lock nut 129. Each of the legs 126 is provided with an outwardly extending lug 130, the two lugs slidably engaging oppositely arranged and like cam surfaces provided on a ring 131 which is secured in the casing.

With the handle 124 in what is called the throttle closed position, in which it is shown in Fig. 1 of the drawings, the lugs 130 engage portions of the cam surfaces on ring 131 which permit the bias spring 123 to move the cap nut 122, plunger 118 and the member 127 to a maximum upward position in which the supply valve 112 is held seated by spring 113 and the release valve 120 is unseated by spring 121. With the supply valve seated and the release valve unseated, chambers 100 and 98 and also the control pipe 101 are open to atmosphere past said release valve and through the plunger 118.

If the handle 124 is moved from the throttle closed position in a counterclockwise direction toward the full open throttle position, the cylindrical portion 125 on the handle engaging the legs 126 on member 127 will turn said member relative to the ring 131 due to which the cam surfaces on ring 131 will move member 127 and thereby the cap nut 122 and plunger 118 downward in the direction of the release valve 120. If this downward movement is greater than the clearance between the plunger 118 and the release valve 120, the plunger will move into seated relation with said release valve and then move said release valve to unseat the supply valve 112 to an extent corresponding to the degree of movement of the handle 124 out of the throttle closed position after closing of said release valve. Fluid under pressure supplied to chamber 94 from the supply reservoir 53 via pipe 52 will then flow past the unseated supply valve 112 to chamber 100 and thence to the control pipe 101 and also through choke 99 into chamber 98 to increase the fluid pressure therein to act on diaphragm 93 in opposition to the pressure of control spring 103. The flow of fluid under pressure to chamber 100 and to control pipe 101 continues until the fluid pressure established in chamber 98 is increased to a degree sufficient to overcome the force of spring 103 and move the diaphragm 93 and thereby the stem 104 in a downward direction sufficient to seat the supply valve 112.

Assuming that movement of the handle 124 from the throttle closed position toward the full throttle open position was less than a maximum degree, the supply valve 112 will be positioned so that movement of the diaphragms 93 and 92 and stem 104 against the force of control spring 103 by reason of increasing pressure in chamber 98 will be relative to said valve until the nut 110 is moved into contact with said valve for preventing further flow of fluid under pressure past valve 112 to chamber 100 and to the control pipe 101. When the supply of fluid under pressure to chambers 100 and 98 and to the control pipe is thus cut off, limiting the increase in such pressure, movement of the diaphragm 93 and stem 104 will cease, since the increased pressure of spring 103 will counterbalance the pressure of fluid in chamber 98. The pressure of fluid in chamber 98 and in the control pipe 101 will thus be limited in accordance with the position of the supply valve 112 which in turn is determined by the extent of movement of the handle 124 from the throttle closed position toward full open throttle position.

If the previous movement of the handle 124 has been to a position less than full open throttle position, the operator may increase the pressure of fluid in chamber 98 and in the control pipe 101 by movement of the handle 124 further in the direction of full open throttle as will be apparent from the above description.

It will thus be seen that by suitable adjustment of the handle 124 out of the throtle closed position toward full open throttle position any desired pressure of fluid may be provided in the control pipe 101 and the pressure thus obtained may be obtained in any desired number of increments.

Assume now that the control pipe 101 is charged with fluid under pressure as just described and the operator desires to reduce the pressure of such fluid. He will move the control lever 124 in the direction of the throttle closed position whereupon the lugs 130 are positioned on the cam surfaces of ring 131 to permit spring 123 to move plunger 118 in the direction of member 127. With the supply valve 112 seated prior to movement of the handle 124 toward release position, spring 121 will hold the release valve 120 in contact with said supply valve and against movement with the plunger 118 so that said release valve is unseated to connect chamber 100 and the control pipe 101 to atmosphere. Fluid under pressure is then released from chamber 100 and pipe 101 and also from chamber 98 above diaphragm 93, and as pressure is reduced in this latter chamber spring 103 will move said diaphragm with stem 104 upwardly and spring 113 acting on the supply valve 112 will move said valve and the release valve in the direction of the plunger 118. If the handle 124 is not moved to the throttle closed position, the plunger 118 will be stopped in a position in which movement of the diaphragm 93 and stem 104 by spring 103, and thereby the supply valve 112 and release valve 120, will be relative to said plunger until said release valve engages the valve seat on said plunger for preventing further release of fluid pressure from chamber 100 and pipe 101. Upward movement of diaphragm 93 will then cease with the failure of fluid pressure in chamber 98 to further reduce and the fluid pressure retained in chamber 100 and pipe 101 will correspond to the position of the handle 124 out of its throttle closed position.

Movement of the handle into the throttle closed position will result in plunger 118 being moved away from the release valve 120 sufficiently to allow full release of fluid pressure from chamber 98 and full extension of spring 103 without the diaphragm 93 moving far enough upward to cause said release valve to be seated against said plunger. It can thus be seen that fluid pressure may be reduced or increased in the control pipe 101 in any desired increment and such pressure is determined by position of the handle 124 between throttle closed and full open throttle positions.

The throttle valve device 5 further includes a quick closing valve device 132 which comprises a casing having a through bore containing a bushing 133 having a fixed and sealing engagement with said casing. The bushing 133 has an axial bore, one end of which terminates in a chamber 134 formed at one end of the casing bore which is closed by a cap nut 135. The chamber 134 contains a supply valve 136 having a stem 137 which has a sliding fit in the axial bore of bushing 133. A sealing ring 138 provided in the wall of the axial bore in bushing 133 provides a sealing engagement with the stem 137. Between the sealing ring 138 and the valve 136 is an annular chamber 139, said chamber being formed in the stem 137 and open by ports 140 to an annular chamber 141 surrounding bushing 133 and open to port 95 leading to pipe 52 and to the supply reservoir 53 whereby the chamber 139 is adapted to be constantly supplied with fluid under pressure. A spring 142 bears at one end against cap nut 135 with the other end bearing against valve 136 for urging said valve to a seated position against the end of bushing 133 to normally prevent flow of supply fluid pressure from chamber 139 to chamber 134.

The supply valve 136 and stem 137 are provided with an axial bore 143 one end of which opens to chamber 134 and the other opens to a chamber 144. Chamber 144 contains a release valve 145 arranged to seat against the stem 137, said valve having a fluted stem 146 which has a sliding fit in the bore 143. Chamber 144 containing the release valve 145 is open to atmosphere by ports 147 in a cap nut 148 closing the end of bushing 133. A plunger 149 extends from chamber 144 through a suitable bore in cap nut 148 for contact with a cam 150 on that part of handle 124 surrounding the plunger 118. Cam 150 on handle 124 is arranged to close release valve 145 and to unseat supply valve 136 only when the handle 124 is moved clockwise from the throttle closed position into a quick throttle closing position. At all other times, pipe 25 connected to chamber 134 is connected to atmosphere past release valve 145.

When the handle 124 is moved into quick throttle closing position, cam 150 acts through plunger 149 against valve 145 to seat said valve against stem 137 and then to open supply valve 136, thereby to admit fluid supply pressure past valve 136 to chamber 134 and thence through pipe 25 to passages 23 and chambers 21 in the positioning motors 3 and 4 to effect quick and positive closing of the throttles 1 and 2 as described above.

The throttle closing valve device 6 comprises a casing having chambers 151 and 152 connected to the control pipe 101. Chamber 151 contains a valve 153 having a fluted stem 154 extending through a bore into a chamber 155 connected by pipe 17 and port 34 to control chamber 33 at one side of the control diaphragm 32 in the throttle valve positioning motor 3. Chamber 152 contains a valve 156 having a fluted stem 157 extending through a suitable bore into a chamber 158 connected by pipe 18 to the control chamber 33 of throttle positioning motor 4.

Extending through a bore into chamber 155 opposite valve stem 154 is a valve stem attached to a valve 159 located in a chamber 160. Chamber 160 is connected by way of a pipe 161, cock 162 and pipe 163 to a volume reservoir 164 and also through a choke 165 to atmosphere. Extending through a suitable bore into chamber 158 opposite valve stem 157 is a valve stem attached to a valve 166 located in a chamber 167. Chamber 167 is connected by a pipe 168, a cock 169 and pipe 170 to a volume reservoir 171 and also to atmosphere through a choke 172. In chamber 160 a precompressed spring 173 acts against valve 159 to urge the valve to a normally seated position and to normally support valve 153 in an unseated position. In chamber 167 a precompressed spring 174 acts against valve 166 to support it in a normally seated position and to support valve 156 in a normally unseated position.

A plunger 175 extends from the upper side of the valve casing through a suitable bore into chamber 151 wherein it is adapted to engage valve 153. A sealing ring is provided in a cavity in the bore through which plunger 175 extends, said sealing ring being adapted to maintain a sealing engagement with both the casing and said plunger to prevent leakage of fluid pressure from chamber 151 to atmosphere. The outer end of plunger 175 is provided with a suitable operator's push button 176 which is retained in a cavity in the valve casing where it is protected against accidental operation.

The application of manual pressure to the button 176 causes plunger 175 to enter chamber 151 and to move valves 153 and 159 downward to a position in which valve 159 is unseated and valve 153 is seated. Release of button 176 permits closing of valve 159 and opening of valve 153. It will therefore be seen that when the button 176 is relieved of manual pressure opening pipe 17 to pipe 101, the operator's control device 5 is rendered effective to control operation of the throttle control motor 3 and throttle valve 1 to control the respective engine, while in case it is desired to cut off the supply of power fluid to the engine in case of slipping wheels thereon, this may be accomplished by depressing the button 176 to close communication between pipes 101 and 17 and to release fluid pressure in pipe 17 past valve 159 to pipe 161 and thence through cock 162 either to atmosphere direct or to volume reservoir 164 and to atmosphere through choke 165. This venting of fluid pressure from pipe 17 reduces the control pressure in the throttle positioning motor 3 to atmosphere to cause the motor to close the throttle on the respective engine.

Releasing manual pressure from the button 176 as after wheel slipping ceases permits spring 173 to return valves 159 and 153 to the position shown in the drawing wherein control fluid pressure from pipe 101 will again flow to pipe 17 and to the throttle positioning motor 3 for effecting opening of the throttle on the respective engine to the same degree as before depressing of button 176.

Similarly, a plunger 177 having an operator's push button 178 extends through the casing into chamber 152 for the purpose of operating the valves 156 and 166 to either render the positioning motor 4 and throttle valve 2 controllable by the operator's control device 5 independently of or in unison with the control of motor 3 and throttle valve 1 or for, in case of slipping wheels on the respective engine causing operation of the positioning motor 4 and throttle valve 2 to cut off the supply of power to the respective engine in the same manner as above described in connection with depression of push button 176.

The cocks 162 and 169 are the well-known three-way type and when positioned as shown in Fig. 1 are adapted to permit automatic sanding of the rail surfaces in front of the wheels of the respective engines upon closing of the throttle valve 1 or 2 by reason of operation of plungers 176 or 178 in the closing valve device 6. When fluid pressure is admitted to pipe 168 upon closing throttle valve 2 by depression of plunger 178, it flows to cock 169 and thence, with the cock in the position in which it is shown, to pipe 170 and volume reservoir 171 and also to atmosphere through choke 172. If no sanding of the rail surface is desired the cock 169 will be positioned to disconnect pipes 168 and 170 and to connect the pipe 168 to atmosphere at the cock.

When fluid pressure is supplied to volume reservoir 171 it is also supplied by a pipe 179 to the sanding control valve 7.

The sanding valve device 7 comprises a casing enclosing a diaphragm 181 having at one side thereof a control chamber 182 open at all times to reservoir 171 by pipe 179. A chamber 183 provided at the opposite side of diaphragm 181 is open to atmosphere by a breather 184. Chamber 183 contains a follower 185 engaging diaphragm 181. A shoulder 186 on the casing is provided for engaging follower 185 to limit the deflection of diaphragm 181 by pressure of fluid in chamber 182. A spring 187 in chamber 183 acts on follower 185 to oppose the pressure of fluid in chamber 182.

The follower 185 is provided with a stem 188 extending through chamber 183 and a bore in the casing coaxial with diaphragm 181 into a chamber 189 connected by a pipe 190 to a fluid pressure supply reservoir 191 which may be charged with fluid under pressure from any suitable source. Stem 188 is provided with an annular groove to receive a retaining ring 192. A plate 193 is provided with a central bore and a recess of suitable diameter to receive the retaining ring 192. Before assembling the follower 185 and stem 188 into the casing, the spring 187 and plate 193 are placed over said stem and the spring compressed so that the retaining ring 192 can be placed in the groove in said stem to hold said spring compressed while the valve device is being assembled. Stem 188 is further provided with an annular groove within the casing bore to contain a sealing ring 188a to prevent leakage of fluid pressure from chamber 189 to chamber 183 and thence to atmosphere through breather 184.

The stem 188 is connected to a supply valve 194 to move said valve with said stem. The supply valve is contained in chamber 189 and has a fluted stem 195 which is slidably mounted in a bore 196 extending through a stem 197 of a valve 198 contained in a chamber 199 which is connected by a pipe 200 to a sanding reservoir 201. The stem 197 is slidably mounted in a bore coaxial with stem 188 and is encircled by a chamber 202, the valve 198 controlling communication between said chamber and chamber 199. A sealing ring provided in a groove in the wall of the bore between chambers 202 and 189 slidably engages stem 197 to prevent leakage of fluid pressure from one chamber to the other. Chamber 202 is in constant communication with a pipe 203 adapted to be connected to a conventional sanding device operative when supplied with fluid pressure to apply sand to a rail surface. Chamber 199 contains a spring 198a which acts on valve 198 normally urging it into a seated condition against the casing, to close communication between chambers 199 and 202.

In operation, normally chamber 182 is at atmospheric pressure by way of choke 172 and spring 187 acting against follower 185 supports the diaphragm 181 in the position in which it is shown in the drawing. In this position of diaphragm 181 and follower 185, the stem 188 is positioned to hold valve 194 from its seat on stem 197 and spring 198a maintains valve 198 seated against the valve casing. Fluid under pressure in the supply reservoir 191 then flows past valve 194 through bore 196 to chamber 199, thence by pipe 200 to reservoir 201 to charge reservoir 201 to the pressure of fluid in the reservoir 191.

In case the operator presses button 178 of the throttle closing valve 6 to cut off the supply of power fluid to the respective engine as in case of slipping wheels thereon, fluid under pressure in pipe 18 and in the control chamber 33 of the throttle positioning motor 4 is vented to pipe 168 and thence by way of cock 169, when positioned as shown, and pipe 170 to reservoir 171 and through pipe 179 to diaphragm chamber 182 in the sanding valve device 7. A portion of the fluid pressure thus supplied to pipe 170 will be dissipated through choke 172, but the flow capacity of this choke is such with respect to the amount of fluid supplied to said pipe and reservoir 171 to create a sufficient force in chamber 182 on diaphragm 181 to cause said diaphragm to move against spring 187 until the follower 185 engages shoulder 186 on the casing. During this movement of the diaphragm 181 and follower 185, the stem 188 will move the supply valve 194 into a seated position against stem 197 and will act against said stem to unseat valve 198. Communication from the supply reservoir 191 to the sanding reservoir 201 is thereby cut off by the supply valve numeral 194 and communication from the sanding reservoir 201 is established with chamber 202 and pipe 203 by valve 198. Fluid pressure in the sanding reservoir 201 then flows through pipe 203 to a sanding device (not shown) to cause sand to be applied to the rail surface before the wheels of the respective engine, whose throttle 2 was closed by depression of the button 178. Sand will thus be applied to the rail surface for a period of time which may be determined by the time for dissipating the fluid under pressure from reservoir 201 through the sanding device or by the release of fluid pressure from reservoir 171 and control chamber 182 through the choke 172, it being apparent that the pressure of fluid in diaphragm chamber 182 will, after a certain lapse of time, become reduced through said choke to a degree at which spring 187 will actuate said diaphragm to permit closing of valve 198 and thereby cutting off of further flow of fluid under pressure to the sanding device.

The sanding control valve device 8 is the same as and functions the same as the sanding control valve device 7 except it is controlled by operation of the push button 176, on the throttle closing valve device 6, for causing an independent closing of the throttle 1 by motor 3.

If it is desired that no sand be applied to the rail surface when the throttles are independently closed, the cocks 162 and 169 may be operated to a position in which pipes 161 and 168 are connected to atmosphere through said cocks without admitting fluid pressure to the reservoirs 164 and 171 and to the sanding control valve devices 7 and 8.

It can now be seen that the throttle valves 1 and 2 can be simultaneously controlled by the operator's control valve device 5 through the medium of pipe 101, the throttle closing valve device 6 and pipes 17 and 18, respectively. If, however, it becomes necessary to close either of the throttle valve 1 or 2 to cut off the supply of power fluid to the respective engine in case of slipping of the wheels thereon, this may be accomplished merely by depressing the respective push button 176 or 178, it being noted that this cutting off of the supply of power fluid to one engine by depressing button 176 or 178 has no effect upon the supply to the other engine which remains under control of the operator's control device. It will further be seen that upon release of button 176 or 178, as upon termination of wheel slipping, power fluid will be resupplied to the respective engine by the operator's control device 5 to the same degree as on the other engine.

Sanding of the rail surface in front of the wheels driven by the engine whose throttle is independently closed by depressing of button 176 or 178 may be either obtained at the same time the throttle is closed, or if desired prevented, by positioning of cocks 162 and, or, 169 to either open pipes 161 and 168 to the sanding control valves 7 and 8 or to atmosphere direct.

*Description—Fig. 4*

The embodiment of our invention shown in Fig. 4 of the drawings includes an operator's throttle control valve device 5, two throttle valve positioning motors 204 and 205, a throttle closing valve device 206, two sanding control valve devices 7 and 8, and two wheel slip detecting devices 207 and 208.

The operator's throttle control valve device 5 is the same as that shown in Fig. 1, and described above.

The throttle positioning motor 204 comprises a power portion 209 and a pilot portion 210. The power portion 209 is the same as the power portion 14 of the positioning motor shown in Fig. 2. Briefly, the power portion 209 comprises a casing having a bore in which a double acting piston 211 is located, said piston being operatively connected by a piston rod 212 and link 15 and lever 12 to a throttle valve 1 (see Fig. 1) for controlling operation thereof. A control chamber 213 at one side of piston 211 is connected by a passage 214 to the pilot portion 210 which, as explained hereinafter, controls the fluid pressure therein. A chamber 215 containing a closing spring 216 is connected to the pilot portion by a passage 217.

The pilot portion 210 comprises a control diaphragm 218 clamped at its periphery in the casing and secured at its central portion to a control stem 219 which is arranged to cooperate with a plunger 220 to control an application valve 221 and a release valve 222 for regulating supply of fluid pressure to or release of fluid pressure from chamber 213 for controlling the position of piston 211 and hence the degree of opening of the throttle valve 1 in accordance with the degree of control fluid pressure supplied to a control chamber 223 at one side of said diaphragm.

The pilot portion further comprises an intercepting valve portion comprising a slide valve 224 contained in a chamber 225 formed in the casing by a piston 226 of one diameter and a piston 227 of a larger diameter. Pistons 226 and 227 are connected by a stem 228 extending through chamber 225 and provided with a recess to receive the slide valve 224 for causing movement of said slide valve by and with said pistons. A chamber 229 is located at the side of piston 227 opposite chamber 225 and is connected to the latter chamber by a passage 230 and a choke 231. Chamber 229 is also connected by a passage 232 and a pipe 233 to the sanding valve device 7 and by pipe 234 to the wheel slip detector device 207.

A piston 235 of a diameter larger than piston 227 is solidly secured by a stem 236 to piston 226. A chamber 237 formed in the casing by pistons 226 and 235 is open to atmosphere through a port 238 in the casing. A chamber 239 is formed at the face of piston 235 opposite chamber 237, said chamber 239 being open at all times through a passage 240 and a pipe 241 to the closing valve device 206.

The slide valve 224 contains cavities 242, 243, 244 and port 245. Cavity 242 is adapted to connect passage 214 from the control chamber 213 at one side of piston 211 to a passage 246 leading to a chamber 247 located between the stem 219 and the plunger 220 containing the release valve 222, in one position of the slide valve 224, and to connect passage 214 to an atmospheric passage 247a in a second position of the slide valve, said second position to be attained as described later.

Cavity 243 in the slide valve 224 is arranged in the position of said slide valve in which it is shown in the drawing to connect passage 217, open to chamber 215 at the spring side of piston 211, to the atmospheric passage 247a. In the second position of slide valve 224 cavity 243 is adapted to connect passage 217 to a passage 248 which is connected to a pipe 249 and to a fluid pressure supply reservoir 250.

Cavity 244 and port 245 in slide valve 224, when said slide valve is in the position in which it is shown in the drawing connects passage 251 leading to the control chamber 223 at the face of the control diaphragm 218 to a passage 252 leading to a control pipe 253 which is connected to the operator's throttle control valve device 5 whereby the control valve device 5 may control the fluid pressure in the control chamber at the face of diaphragm 218. In the second position of slide valve 224, cavity 244 connects passage 251 to passage 254 which is a branch of passage 247a leading to atmosphere while port 245 connects passage 246 and the release valve chamber 247 to said cavity and thus to atmosphere.

In operation, fluid from the supply reservoir 250 is supplied direct to the slide valve chamber 225 via pipe 249, and passages 248 and 255 wherein it acts against adjacent sides of pistons 226 and 227. Fluid under pressure in chamber 225 flows via port 230 and choke 231 to chamber 229 at the side of piston 227 opposite chamber 225 to thereby charge chamber 229, pipes 233 and 234 the control chamber of the sanding valve device 7 and a valve chamber in the wheel slip detector device 207 with fluid at supply pressure. Chamber 237 is at atmospheric pressure via port 238, and chamber 239 is normally at atmospheric pressure via passage 240 and pipe 241 as will hereinafter be explained. As can now be seen, the fluid pressures acting on opposite sides of pistons 227 and 235 are balanced, while piston 226 is subject to fluid at supply pressure in chamber 225 and to atmospheric pressure in chamber 237 which creates a force to bias pistons 235, 226 and 227 and thereby slide valve 224 to the position in which it is shown in the drawing and which is determined by the engagement of pistons 227 and 235 with the casing.

As will be explained hereinafter, fluid pressure in chamber 229 is automatically vented by the wheel slip detector 207 when wheel slip occurs. When chamber 229 is thus vented, the opposing fluid pressure forces on both pistons 226 and 227 are unbalanced and since piston 227 is of larger area than piston 226 the differential of forces across piston 227 exceeds the differential of forces across piston 226 and will actuate piston 227 to move the several pistons and slide valve 224 toward chamber 229 until piston 227 engages the casing. As the slide valve 224 is moved to this latter position, the control pipe 253 is disconnected from the control chamber 223 and said chamber 223 is connected to atmosphere via passage 251, cavity 244 and passages 254 and 247a. At this same time, fluid pressure in chamber 213 acting on the face of piston 211 is vented to atmosphere via passage 214, cavity 242 and passage 247a and fluid under pressure is supplied to chamber 215 at the spring side of the power piston 211 via passage 248, cavity 243 and passage 217, to effect movement of piston 211 and thereby of the throttle operating lever 12 to the throttle closed position.

When fluid pressure is restored in chamber 229, as will be explained later, the opposing fluid pressures on piston 227 become balanced and the unbalance of fluid pressures acting on piston 226 will then move the pistons 235, 226 and 227 and slide valve 224 back to the position in which it is shown in the drawing and in which, chamber 215 at the spring side of piston 211 is connected to atmosphere by cavity 243, chamber 213 at the other side of piston 211 is connected to chamber 247 between stem 219 and plunger 220, and the control chamber 223 at the face of diaphragm 218 is connected to fluid pressure in the control pipe 253.

When both chambers 225 and 229 are charged with fluid at supply pressure and fluid under pressure is supplied to chamber 239 by a manual operation to be explained later, the fluid pressure forces across pistons 235 and 226 are unbalanced with the greater force acting on the larger piston 235 in the direction of chamber 237 in opposition to the force of fluid pressure in chamber 225 acting on piston 226. This greater force on piston 235 will then move said piston and pistons 226 and 227 with slide valve 224 toward chamber 229 until piston 227 engages the casing, which as explained above, will cause movement of piston 211 to throttle closed position.

When pressure of fluid in chamber 239 is reduced to atmospheric pressure and while chambers 225 and 229 remain charged with fluid pressure, pistons 235, 226 and 227 with slide valve 224 will be returned to the position in which they are shown in the drawing for rendering the power portion 209 of the throttle positioning motor controllable by the operator's control device 5 through the control pipe 253.

The throttle closing valve device 206 is the same in construction as the throttle closing valve device 6 shown in Fig. 1 except chambers 160 and 167 are connected by a port 256. Chambers 166 and 167 are open at all times to fluid supply pressure in pipe 249. Chambers 151 and 152 are open at all times by a pipe 257 to the quick closing valve 132 of the operator's throttle control valve device 5. Chamber 155 is open by pipe 241 and passage 240 to chamber 239 of the throttle positioning motor device 204 and chamber 158 is open by a pipe 258 to a chamber, corresponding to chamber 239 in motor 204, in the throttle positioning motor 205.

It can now be seen that both positioning motors 204 and 205, can be caused to operate to a throttle closed position by operating the operator's throttle control valve device 5 to the quick throttle closing position in which fluid pressure is supplied to pipe 257 thence past valves of the throttle closing valve device 206 to pipes 241 and 258 to the throttle positioning motors to effect closing of both throttle valves 1 and 2.

It can also be seen that either push buttons 176 or 178 may be operated to effect individual operation of the respective throttle positioning motor 204 or 205 and the closing of the throttle valve associated therewith.

The sanding control valve devices 7 and 8 may be constructed the same as the sanding control valve device 7 and 8 shown on Fig. 1. In the embodiment shown in Fig. 4, the supply reservoir 191 is, however, connected to chamber 202 in the sanding control valve device and pipe 203 through which fluid pressure is supplied to effect sanding of the rail surfaces is connected to chamber 189.

Normally, the pipes 233 at both engines are charged with fluid under pressure to effect operation of the respective sanding control valves 7 and 8 to permit flow of fluid pressure from the supply reservoirs 191 to the sanding reservoirs 201. When fluid pressure is vented from either pipe 233 by the wheel slip detector 207 or 208, as will be explained in connection with the description of the wheel slip detector device, the respective sanding valve 7 or 8 will operate to cut off flow of fluid pressure from the respective supply reservoir 191 to the respective sanding reservoir 201 and to allow fluid pressure in said sanding reservoir to flow to the respective pipe 203 to effect sanding of the rail surface.

The wheel slip detecting devices 207 and 208 may be of the type disclosed and claimed in Patent No. 2,447,709, issued August 24, 1948, to Joseph C. McCune.

Essentially, each of these wheel slip detector devices comprises a fly-wheel or rotary inertia element suitably journaled for rotation and adapted to be driven by an axle of the locomotive driving wheels in such a manner that whenever a certain rate of change of driving speed of the axle occurs, a corresponding rotational displacement of the fly-wheel with respect to its journal is effected to cause unseating of a normally seated vent valve which, as applied to the present invention, will effect a venting of fluid pressure from pipe 234 to the atmosphere.

In operation, sudden acceleration of a driven axle on either locomotive engine above a certain rate, as occurs when the wheels slip as the result of the application of too much driving force, will cause the wheel slip detector device 207 or 208 associated with the slipping wheels to function to vent fluid pressure from the respective pipe 234 to the atmosphere. Each pipe 234 is in direct communication through pipe 233 with chamber 182 of the respective sanding valve 7 or 8 and by passage 232 with chamber 229 at the face of the respective piston 227, thus it can be seen that operation of either wheel slip detector device 207 or 208, due to a slipping condition of the wheel, will effect sanding of the rail surface and a closing of the throttle valve 1 or 2 of the respective engine upon which slipping of the wheels is occurring.

*Summary*

It will now be seen that we have provided in the apparatus shown in Figs. 1 and 2, a simplified pneumatically operated throttle control for two engine locomotives wherein the operator is enabled by a single control valve to control two throttle control motors and thereby the power of both engines in unison or he may, by the simple operation of pressing one of two buttons, selectively effect a quick and positive closing of the throttle valve on either one of the engines without affect on the throttle valve of the other engine. This he may do to permit the slipping wheels on either engine to return to rail speed while the other engine continues to work uninterruptedly. As soon as the wheel slip condition is corrected, the operator can remove the pressure on the selected button and the respective closed throttle valve will be returned to its open position as determined by the position of the operator's throttle control valve handle. The apparatus also embodies rail sanding means, which, if desired, will automatically operate, in response to depression of the button for cutting off the power of either engine, to sand the rails for increasing traction of slipping engine wheels to aid in stopping slipping thereof.

The apparatus shown in Fig. 4 embodies a throttle control equipment incorporating the same operational functions of the apparatus shown in Fig. 1, together with an automatic closing of the throttle and sanding of the rail surface in the event of a wheel slip condition without effort on the part of the operator.

Having described two embodiments of our invention and illustrated each by a specific construction, it is not our intention to be limited to either of the particular embodiments or to the arrangement shown or otherwise than by the spirit and scope of our appended claims.

Having now described our invention, what we desire to secure by Letters Patent, is:

1. A control apparatus for the usual throttle on each of a plurality of locomotive power units comprising a throttle control motor on each unit operable in accordance with pressure of fluid to correspondingly regulate the respective throttle and thereby the propulsion power on each unit, a single operator's control device connected to all of the throttle control motors for varying the pressure of fluid therein, in a range to provide full range of adjustment of said throttles, valve means controlling communication between said operator's control device and all of the throttle control motors and selectively operable to disconnect any one of the motors from said operator's control device and to release fluid under pressure from the disconnected motor and sanding control means associated with each locomotive unit operable by fluid under pressure released from the respective throttle control motor.

2. A throttle control apparatus for a plurality of locomotive engines each having the usual individual throttle, comprising in combination, a power motor for adjusting each throttle throughout its full range of adjustment, each motor comprising a power portion for adjusting the respective throttle, an intercepting valve, and a pilot portion responsive to pressure of fluid in an adjust communication to control said power portion according to the pressure of such fluid, an operator's control device operative at all times for controlling the fluid pressure in said communication, each intercepting valve being operative to disconnect the respective pilot portion from said communication and to vent fluid under pressure from the respective pilot portion, a wheel slip detecting device for each engine means for effecting operation of the respective intercepting valve to vent fluid under pressure from the respective pilot portion in response to operation of the respective wheel slip device, manually operable valve means selectively operable to cause operation of any one of the intercepting valves to vent fluid under pressure from the respective pilot portion, and means for reopening the throttle upon termination of operation of said wheel slip device or manually operable valve means.

3. A control apparatus for a plurality of railway prime movers comprising for each prime mover the usual throttle and a power control means operable by fluid under pressure to vary the position of said throttle and thereby the power output of the prime mover over its full range in proportion to the pressure of such fluid, an operator's control device for regulating the pressure of fluid in all of said power control means in unison, individual operator's controlled means for each of said power control means normally rendering the respective power control means controllable by said control device and also operable to disconnect the respective power control means from said control device and to release fluid under pressure therefrom, and rail sanding means fo reach prime mover arranged for operation by fluid under pressure released from the respective power control means by the respective individual operator's controlled means.

4. A control apparatus for a plurality of railway prime movers comprising for each prime mover the usual throttle and a power control means operable by fluid under pressure to vary the position of said throttle and thereby the power output of the prime mover over its full range in proportion to the pressure of such fluid, an operator's control device for regulating the pressure of fluid in all of said power control means in unison, individual operator's controlled means for each of said power control means normally rendering the respective power control means controllable by said control device and also operable to disconnect the respective power control means from said control device and to release fluid under pressure therefrom, fluid pressure operable rail sanding means for each prime mover, and means for either preventing or permitting flow to the respective rail sanding means of fluid under pressure released from the respective power control means by operation of the respective individual operator's controlled means 5. A control apparatus for a plurality of prime movers comprising for each prime mover the usual throttle and throttle control means having a power off position and a power on position and adjustable out of said power off position upon supply of fluid under pressure to one chamber, when fluid under pressure is released from a second chamber, to correspondingly adjust said throttle for thereby varying the power output of the respective prime mover in proportion to the pressure of fluid in said one chamber and operable to said power off position upon supply of fluid under pressure to said second chamber and release of fluid under pressure from said one chamber to close said throttle, an operator's control device for controlling pressure of fluid in said one chamber in all of the throttle control means in unison, intercepting means for each throttle control means having one position for venting the respective second chamber and for establishing a communication to the respective one chamber to render the pressure of fluid therein controllable by said operator's control device, and having a second position for supplying fluid under pressure to said second chamber and for venting said one chamber, and an individual operator's control means for each intercepting means normally conditioned to effect movement of the respective intercepting means to its one position and operable to effect movement of the respective intercepting means to its second position.

6. A control apparatus for the usual throttles of a plurality of prime movers comprising for each throttle, throttle control means having a power off position and adjustable out of said power off position upon supply of fluid under pressure to one chamber, when fluid under pressure is released from a second chamber, to position the respective throttle for varying the power output of the respective prime mover in proportion to the pressure of fluid in said one chamber and operable to said power off position upon supply of fluid under pressure to said second chamber and release of fluid under pressure from said one chamber, an operator's control device for controlling pressure of fluid in said one chamber in all of the throttle control means in unison, intercepting means for each throttle control means having one position for venting the respective second chamber and for establishing a communication to the respective one chamber to render the pressure of fluid therein controllable by said operator's control device, and having a second position for supplying fluid under pressure to said second chamber and for venting said one chamber, and wheel slip responsive means for each prime mover operable upon slipping of a wheel of the respective prime mover to effect movement of the respective intercepting means to its second position.

7. In a control apparatus for the usual throttles of a plurality of engines, in combination, a positioning motor for the throttle of each engine operative by fluid pressure to open said throttle, an operator's valve device operative to supply fluid under pressure to all of the throttle motors, and mechanism comprising valve means controlling separate communications from said valve device to all of said motors and operative by manual pressure to selectively close the said communication to any one of said motors and to release fluid under pressure from the respective motor to cause closing of the respective throttle, and means operative upon relief of manual pressure on said valve means to actuate said valve means to open the communication closed by manual pressure on said valve means.

8. In a control apparatus for the usual throttles of a plurality of engines, in combination, a positioning motor for the throttle of each engine operative by fluid pressure to open said throttle, an operator's valve device operative to supply fluid under pressure to all of the throttle motors, mechanism comprising valve means normally biased to establish communications from said valve device to all of said motors, and operative by manual pressure to selectively close the said communication to any one of said motors and to release fluid under pressure from the respective motor to cause closing of the respective throttle, and rail sanding means associated with each engine operable by fluid under pressure released from the respective throttle motor.

9. Apparatus for controlling the usual throttle on each engine of a multi-engine locomotive, comprising in combination, a motor for each engine throttle comprising a power portion connected to the throttle and having a throttle closed position and movable by fluid under pressure out of said position to an extent proportionate to the pressure of such fluid to correspondingly open the respective throttle, means operative upon release of said fluid under pressure from said power portion to move same to a throttle closed position to correspondingly position the respective throttle, each motor further comprising a pilot portion operative by fluid under pressure to provide fluid to said power portion at a pressure corresponding to actuating pressure on said pilot portion, a throttle control pipe, an operator's control device connected to said pipe for either venting said pipe or providing fluid at different pressures in said pipe, and valve mechanism normally establishing a separate communication between said pipe and each pilot portion and operative by manual pressure to close such communication and establish a fluid pressure venting communication from the respective pilot portion.

References Cited in the file of this patent

UNITED STATES PATENTS

| Number | Name | Date |
|---|---|---|
| 905,589 | Ross | Dec. 1, 1908 |
| 1,057,941 | Crawford | Apr. 1, 1913 |
| 2,170,766 | Rieger | Aug. 22, 1939 |
| 2,197,731 | Nonemaker et al. | Apr. 16, 1940 |
| 2,198,022 | Aikman | Apr. 23, 1940 |
| 2,198,031 | Farmer | Apr. 23, 1940 |
| 2,288,173 | Wohanka | June 30, 1942 |
| 2,299,887 | Fell | Oct. 27, 1942 |
| 2,321,059 | Anderson | June 8, 1943 |
| 2,383,277 | Stevens | Aug. 21, 1945 |
| 2,404,545 | Stevens | July 23, 1946 |
| 2,406,264 | Stevens | Aug. 20, 1946 |
| 2,408,098 | Schon | Sept. 24, 1946 |
| 2,512,035 | Newell | June 20, 1950 |